United States Patent [19]
Orbeck

[11] Patent Number: 5,752,820
[45] Date of Patent: May 19, 1998

[54] PANEL SUPPORT MECHANISM

[75] Inventor: Gary A. Orbeck, Windham, N.H.

[73] Assignee: BTU International, Inc., North Billerica, Mass.

[21] Appl. No.: 703,469

[22] Filed: Aug. 27, 1996

[51] Int. Cl.$^6$ ........................................ F27D 5/00
[52] U.S. Cl. ...................... 432/253; 432/258; 211/41.14
[58] Field of Search ........................ 432/253, 258; 248/247, 316.8, 346.03; 211/41.1, 41.14

[56] References Cited

U.S. PATENT DOCUMENTS

| | | | |
|---|---|---|---|
| 3,762,901 | 10/1973 | Salisbury et al. | 65/59 |
| 3,849,190 | 11/1974 | Foster et al. | 117/219 |
| 3,862,831 | 1/1975 | Berkenblit et al. | 65/60 |
| 4,058,200 | 11/1977 | Frank | 198/382 |
| 4,059,426 | 11/1977 | Starr | 65/25 A |
| 4,059,427 | 11/1977 | Starr et al. | 65/25 A |
| 4,200,446 | 4/1980 | Koontz | 65/25 A |
| 4,300,937 | 11/1981 | Rhonehouse | 65/114 |
| 4,336,442 | 6/1982 | Starr | 219/400 |
| 4,526,818 | 7/1985 | Hoshikawa et al. | 428/1 |
| 4,697,885 | 10/1987 | Minowa et al. | 350/334 |
| 4,775,549 | 10/1988 | Ota et al. | 427/38 |
| 4,802,421 | 2/1989 | Atterby et al. | 108/51.1 |
| 4,815,601 | 3/1989 | Peterson et al. | 211/41.14 |
| 4,828,598 | 5/1989 | Imamura et al. | 65/104 |
| 4,976,092 | 12/1990 | Shuert | 53/475 |
| 4,988,032 | 1/1991 | Sakaguchi et al. | 228/102 |
| 5,052,164 | 10/1991 | Sandow | 52/709 |
| 5,101,964 | 4/1992 | Westphal et al. | 198/803.01 |
| 5,178,260 | 1/1993 | Hochbein | 198/803.01 |
| 5,255,614 | 10/1993 | Voss-Schrader et al. | 108/56.1 |
| 5,348,142 | 9/1994 | Nishimura et al. | 198/803.01 |

Primary Examiner—Henry A. Bennett
Assistant Examiner—Gregory A. Wilson
Attorney, Agent, or Firm—Weingarten, Schurgin, Gagnebin & Hayes LLP

[57] ABSTRACT

A support assembly for supporting a glass panel during thermal processing. In one embodiment, a support assembly includes a base member, and a mechanism secured to the base member. The mechanism includes a support plate adapted for contact with a panel, wherein the mechanism is operative to distribute the weight of the panel and support plate about a bottom surface of the support plate. In a further embodiment a support assembly includes a base assembly and a leveling assembly having a plurality of plates defining a support surface. An alternative embodiment of a support assembly is adapted for supporting panels in a vertical position and includes a base assembly and a levelling assembly.

25 Claims, 6 Drawing Sheets

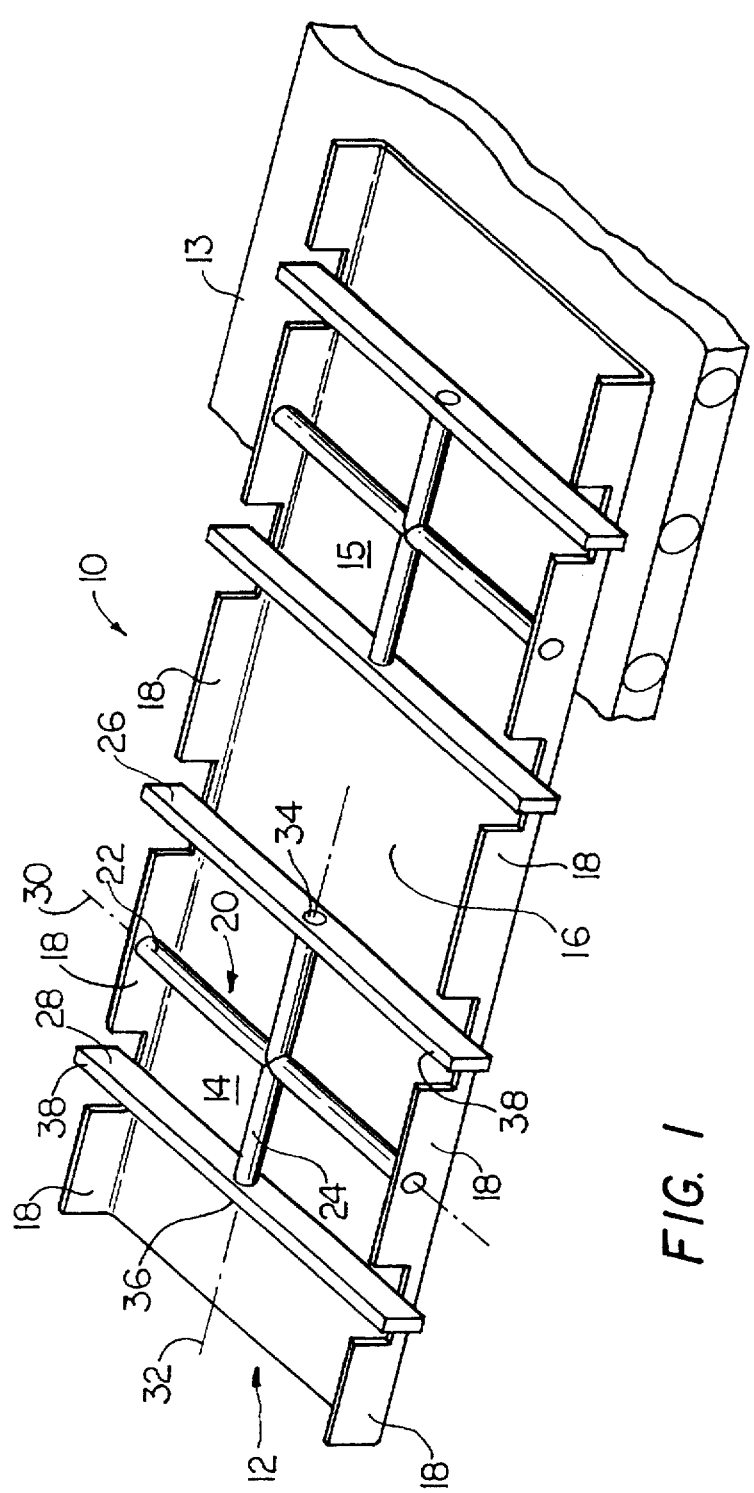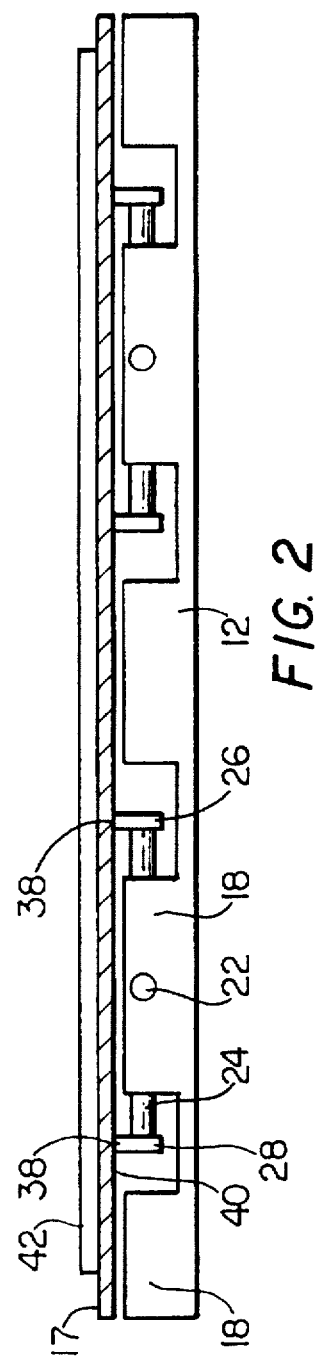

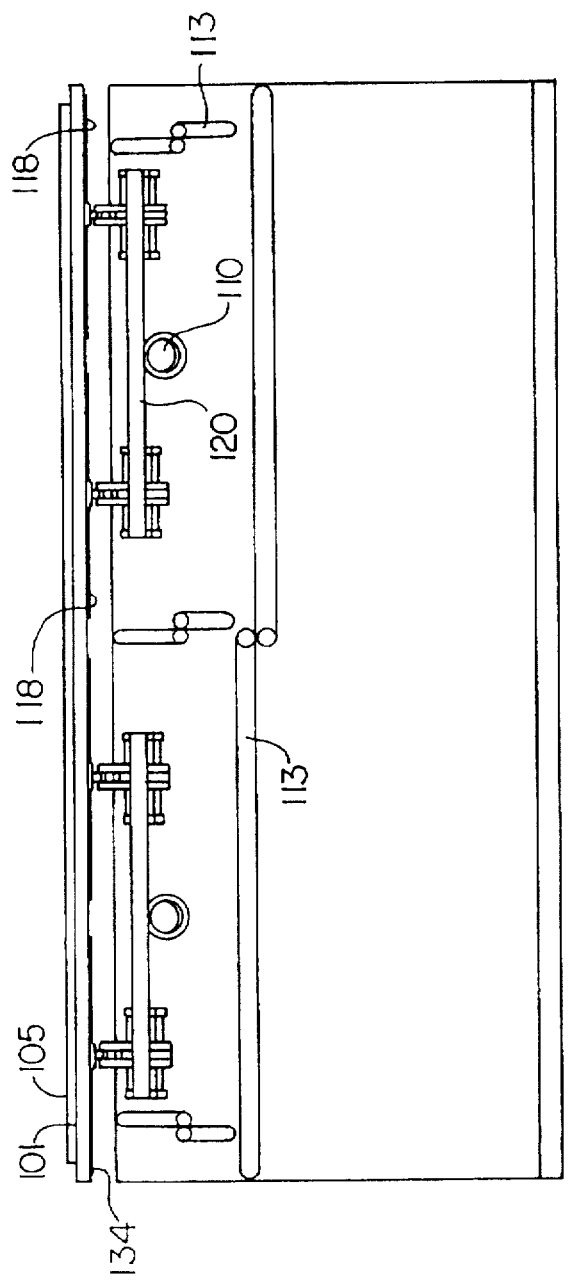
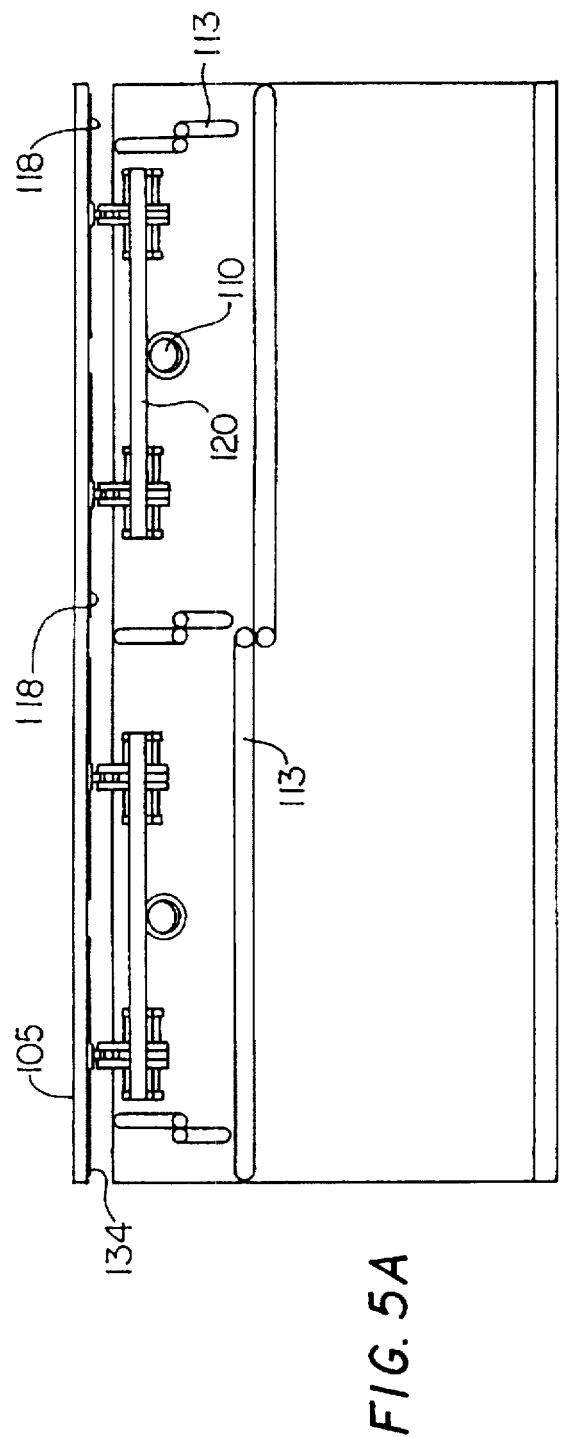
FIG. 5
FIG. 5A

PANEL SUPPORT MECHANISM

FIELD OF THE INVENTION

The invention relates generally to high temperature processing of planar objects, and more particularly to a support mechanism for supporting a glass display panel or other flat object during thermal processing.

BACKGROUND OF THE INVENTION

In the fabrication of glass display panels, the panels are subjected to thermal processing for enhancing properties of the panels, such as firing pastes. Thermal processing typically is performed with the panels in a horizontal position since the strength of the panels is greatly reduced making the panels susceptible to bending and warping if the panel is stressed at elevated temperatures. However, processing of panels while in a vertical orientation is performed when compaction of the glass is required or for other possible requirements. One method of supporting a panel during thermal processing includes placing a panel on a flat, rigid support plate which supports the weakened panel. The support plate is typically ceramic, glass, glass-ceramic, or other suitable material having the desired properties, such as lubricity for preventing the panel from adhering to the support plate, and an ability to maintain flatness in an environment of elevated temperature.

However, as the panels and corresponding support plates become increasingly larger, it becomes ever more difficult to maintain the flatness of the support plate during thermal processing and therefore prevent bending and warping of a panel disposed on the support plate. Thus, it is desired to provide a mechanism to maintain the flatness of a large panel bearing support plate during thermal processing so as to prevent stressing of the panel.

SUMMARY OF THE INVENTION

The present invention overcomes the aforesaid and other disadvantages of known panel support structures by providing a support assembly for supporting a glass panel during thermal processing of the panel. During thermal processing stress on the panel may produce warping or bending of the panel, thus reducing the desired flatness of the panel, such as a glass panel display.

In one embodiment, a support assembly comprises a base member and a mechanism secured to the base member. The mechanism includes a cross member having a first portion defining a first longitudinal axis and a second portion defining a second longitudinal axis substantially perpendicular to the first axis. The first portion is coupled to the base member and is adapted for supporting the mechanism above the base member. The cross member is rotatable about the first longitudinal axis. The mechanism further includes a first support member coupled to the cross member second portion, and a second support member coupled to the cross member second portion, wherein the first longitudinal axis is disposed between the first and second support members. The first and second support members are operative upon rotation of the cross member about the first longitudinal axis to remain in engagement with a bottom surface of a support plate thereby automatically distributing the weight of the support plate, and any panel disposed thereon, about the bottom surface of the support plate. In addition to distributing the weight, the mechanism is also operative to level the support plate in the presence of a displacement of the base member with respect to a horizontal plane.

It will be appreciated that the embodiment described above will be particularly useful in conjunction with a conveyor belt, or other means known in the art, to move a panel through an oven, or other means of thermal processing. The illustrative substrate assembly provides a way to distribute the weight of a support plate and any panel disposed thereon about a bottom surface of a support plate to maintain the flatness of the support plate during thermal processing. A flat support plate eliminates stress to a panel which may introduce bending and warping of a thermally weakened panel. The described structure allows larger support plates, and therefore larger panels to undergo thermal processing without deformation. It is to be understood that in some applications, a panel is placed directly on the support members.

In a further embodiment, a support assembly is adapted for preserving the flatness of a support plate and panel in a high temperature environment and comprises a base assembly and a leveling assembly. The base assembly includes a first portion and a second portion, and a first support pole defining a first longitudinal axis, the first support pole extending from the first portion to the second portion of the base assembly. The leveling assembly is adapted for placement on the base assembly and includes first and second support beams extending from a point proximate the first portion to a point proximate the second portion of the base assembly. The leveling assembly further includes a plurality of plates, or other contact fixtures, defining a support surface adapted for engagement with a bottom surface of the support plate and a first balance member defining a second longitudinal axis.

Each of the plurality of plates is disposed on one of the first and second support beams. The first balance member extends from the first support beam to the second support beam and is adapted for supporting the leveling assembly on the base assembly. The support surface is operative to automatically distribute the weight of the support plate and any panel disposed thereon about the bottom surface of the support plate. The leveling assembly is also operative to level the support plate in the presence of a displacement of the base assembly with respect to a horizontal plane. For some applications, a panel is placed directly on the support surface.

In an alternative embodiment, a panel support assembly is adapted for receiving at least one panel in a vertical position. The panel support assembly includes a base assembly and a leveling assembly. The base assembly includes a first side portion spaced apart from a second side portion connected by first and second connection posts. A support rod extends from the first and second side portions for supporting the panel and leveling assembly. The leveling assembly includes first and second balance members supported by a respective connection post, each of the balance members supporting a pair of contact members defining a panel support surface.

BRIEF DESCRIPTION OF THE DRAWINGS

The invention will be more fully understood from the following detailed description taken in conjunction with the accompanying drawings in which:

FIG. 1 is a perspective view of a first embodiment of a support assembly for a support plate according to the present invention;

FIG. 2 is a side view of the support assembly of FIG. 1;

FIG. 5 is a sectional view of the support assembly of FIG. 3;

FIG. 5A is a sectional view of the support assembly of FIG. 3 showing a panel directly on a support surface;

DETAILED DESCRIPTION OF THE INVENTION

Figure 3:
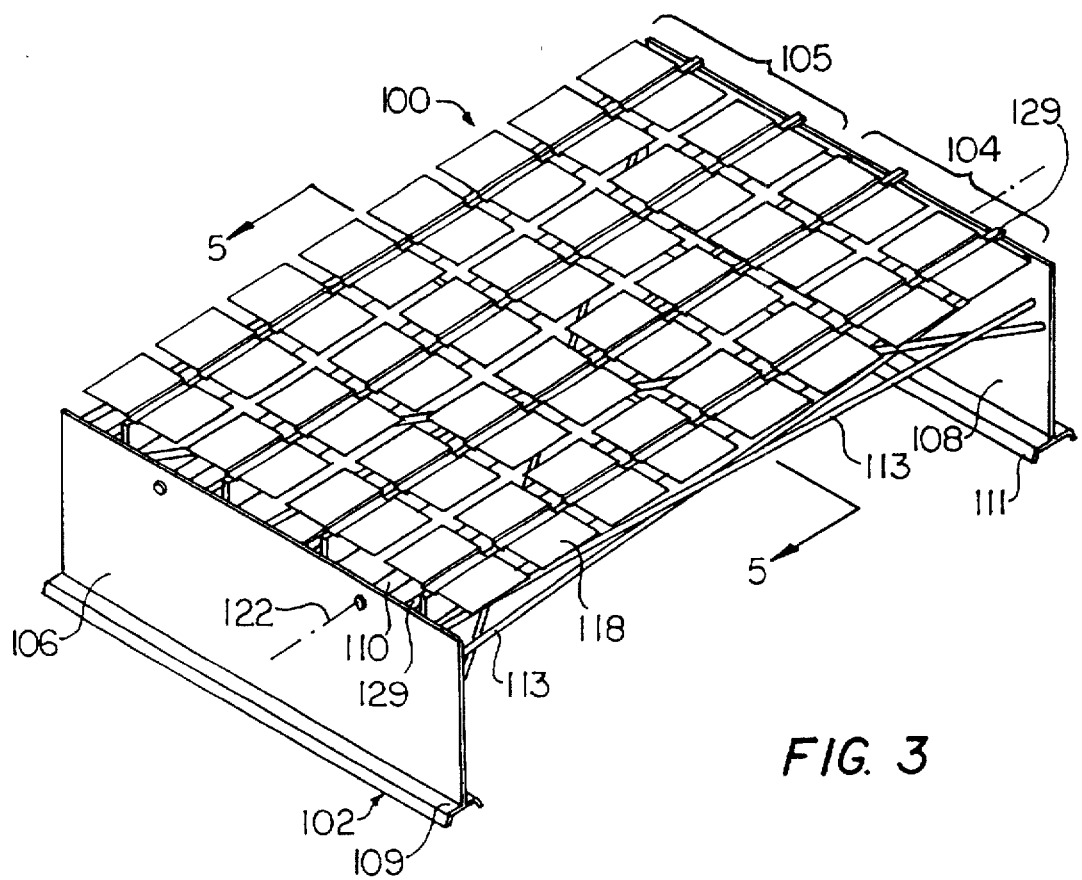
FIG. 3 is a top perspective view of a further embodiment of a support assembly for a panel according to the present invention.

FIGS. 1 and 2 illustrate a support assembly for supporting a support plate having a glass panel disposed thereon during thermal processing. The support assembly can be placed on a conveyor belt or other means to promote movement of the assembly and support plate through an oven or other high temperature environment.

Maintaining the flatness of the support plate in the presence of elevated temperatures is essential in order to prevent bending or warping of the panel caused by stressing of the thermally weakened panel. The support assembly is operative to maintain engagement of a bottom portion of the support plate with a support surface thereby automatically distributing the weight about a support plate bottom surface. This arrangement allows a panel of large size to be thermally processed without stress induced deformation.

In a first embodiment, a support assembly 10 includes a base member 12 adapted for attachment to a conveyor belt 13 and first and second mechanisms 14,15 secured to the base member for supporting a support plate 17. In an exemplary embodiment, the base member 12 includes a substantially flat bottom portion 16 and a plurality of opposing side portions 18 extending perpendicularly therefrom. Each of the first and second mechanisms 14,15 are symmetrical so that the following description of the first mechanism also includes the second mechanism. Furthermore, an alternative embodiment includes a single mechanism disposed on a base member. The first mechanism 14 includes a cross member 20 having a first portion 22 and a second portion 24, and substantially rigid and straight first and second support members 26,28. The cross member first portion 22 defines a first longitudinal axis 30 and the cross member second portion 24 defines a second longitudinal axis 32. In an illustrative embodiment, the first portion 22 is connected between a respective pair of opposing side portions 18 of the base assembly 12 thereby supporting the respective mechanism 14 above the base member bottom portion 16. The cross member 20 is freely rotatable about the first longitudinal axis 30 defined by the cross member first portion 22.

The second portion 24 of the cross member includes a first end 34 and a second end 36, wherein the first end is coupled to the first support member 26 and the second end is coupled to the second support member 28. In an exemplary embodiment, the first and second support members 26,28 are freely and independently rotatable about the second longitudinal axis 32 defined by the second portion 24 of the cross member 20. The second portion 24 of the cross member 20 is coupled to center portions of the respective first and second support members 26,28 in an illustrative implementation. The first and second support members 26,28 are positioned in a spaced apart configuration, wherein top surfaces 38 of the support members form a substantially flat support surface. The support surface supports a flat bottom surface 40 of the support plate 17.

In operation, the support plate 17 is positioned on the support surface. Preferably, the support plate 17 is disposed centrally with respect to the support surface and support assembly base member 12. A glass display panel 42 is then placed on the support plate 17 in symmetry with regard to the perimeter of the support plate for distributing weight equally about the first and second support members 26,28. The panel 42 is preferably disposed centrally with respect to the support plate 17. The first and second support members 26,28 operate to distribute the weight of the panel 42 and support plate 17 about a bottom surface 40 of the support plate. More particularly, the first and second support members 26,28 rotate, if necessary, about the cross member first longitudinal axis 30 to distribute the weight. The first and second support members 26,28 also independently rotate or rock about the second longitudinal axis 32. For first and second support members 26,28 about equally spaced with respect to the first longitudinal axis 30, the weight is equally distributed between the respective first and second support members. Thus, the first and second support members 26,28 automatically distribute the supported weight about portions of the bottom surface 40 of the support plate 17 in contact with the first and second support members. In another embodiment, a panel is placed directly on the support surface.

The first mechanism 14 is also operative to automatically maintain the support plate 17 in a level position in the presence of a displacement of the base member 12 with respect to a horizontal plane. With the base member 12 at horizontal, the first and second longitudinal axes 30,32 define a plane parallel to the horizontal plane. Displacement of the base member 12 with respect to the first longitudinal axis 30 causes the first and second support members 26,28 to rotate thereabout. Similarly, the first and second support members 26,28 rotate about the second longitudinal axis 32 in the presence of a displacement therefrom. Rotation of the first and second support members 26,28 is limited by the base member 12.

In an exemplary embodiment, the base member is about three feet long and about a foot wide and formed from metal or other suitably strong material. The support surface is adapted for a support plate having a perimeter substantially complementing the base member. In a preferred embodiment, the support plate is formed from glass ceramic or other suitable rigid materials, such as high performance glass. The exemplary embodiment of FIGS. 1 and 2 shows the support plate having a thickness of about five millimeters adapted for a panel having a thickness of about three millimeters. Generally, the perimeter of the panel is slightly less than the outline of the support plate.

It will be appreciated that other alternatives and modifications are possible. For example, the support assembly and component parts are shown having a substantially rectangular shape, but other shapes are contemplated without departing from the scope of the invention. A further alternative of a panel support mechanism includes more and less mechanisms, in a spaced apart or other relationship. Furthermore, the above described support assembly can be adapted for support plates and panels having sizes and thicknesses other than described herein without departing from the scope and spirit of the claims. As one skilled in the art will understand, other dimensions for a support assembly can be of use in conjunction with panels and support plates of differing sizes.

FIGS. 3–7 illustrate a further embodiment of a support assembly for supporting a panel and support plate including a series of spaced apart plates disposed on support beams which are rotatable about a plurality of axes. The multiple beam and axis arrangement equally distributes the weight of the support plate about a bottom surface of the support plate, thus maintaining the flatness of the support plate, and therefore the panel, in a high temperature environment.

Figure 4:
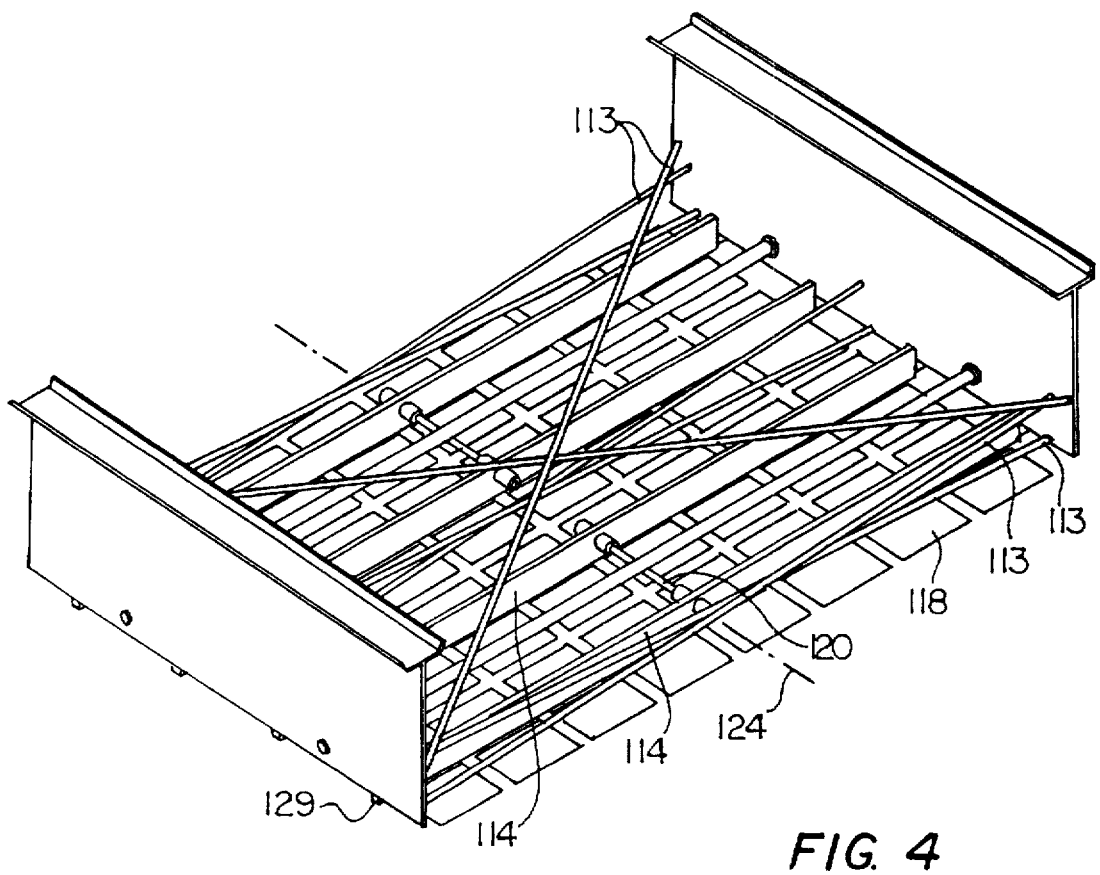
FIG. 4 is a bottom perspective view of the support assembly of FIG. 3.

In an exemplary embodiment shown in FIGS. 3–5, a support assembly 100 for supporting a support plate 103 and a panel 101 includes a base assembly 102 and first and second leveling assemblies 104,105 adapted for spaced placement on the base assembly. The first and second assemblies are substantially similar so that any description of the first is also understood to refer to the second leveling assembly. The base assembly 102 includes opposing first and second side portions 106,108 and a first support pole 110 coupled to the first and second side portions of the base assembly. The base assembly 102 is adapted for attachment to a conveyor belt or other means to move the support plate and panel through thermal processing. In an exemplary embodiment, the first and second side portions 106,108 include respective first and second channels 109,111 for coupling the base assembly 102 to a conveyor belt assembly. As shown, the base assembly includes an elective exemplary brace structure having brace members 113 for stabilizing the support assembly.

The leveling assembly 104 includes a pair of support beams 114 which extend approximately from the first side portion 106 to the second side portion 108 of the base assembly 102. In an exemplary embodiment, the support beams 114 are disposed in opposition with respect to each other. The support beams 114 include an optional stop portion 129 on either end for limiting rotational movement of the support beams by contacting the respective first and second side portions 106,108 of the base assembly 102. The leveling assembly 104 further includes a plurality of plates 118 supported by one of the support beams 114 and a first balance member 120 coupling the support beams 114. The plates 118 are disposed in a spaced apart configuration to form a support surface. The first support pole 110 defines a first longitudinal axis 122 and the first balance member 120 defines a second longitudinal axis 124. The first balance member 120 is adapted for supporting the leveling assembly 104 on the first support pole 110.

Figure 6:
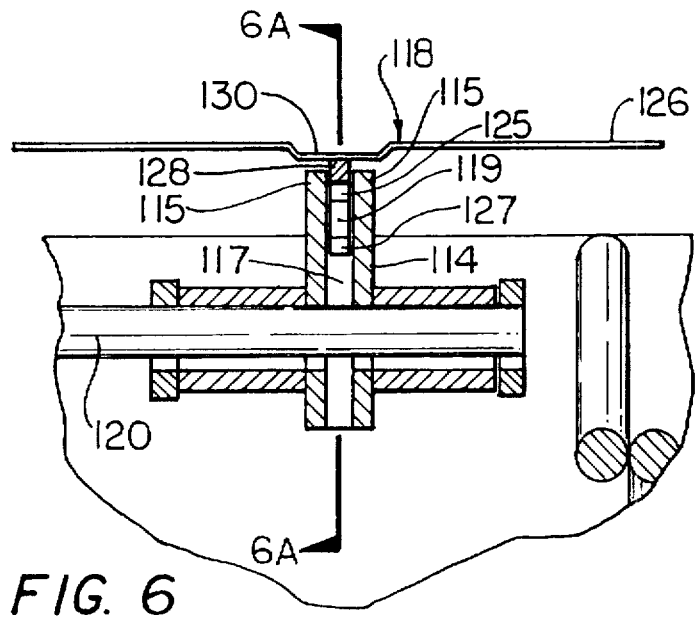
FIG. 6 is a detailed cross sectional view of a representative plate and support beam of the support assembly of FIG. 3.
Figure 6A:
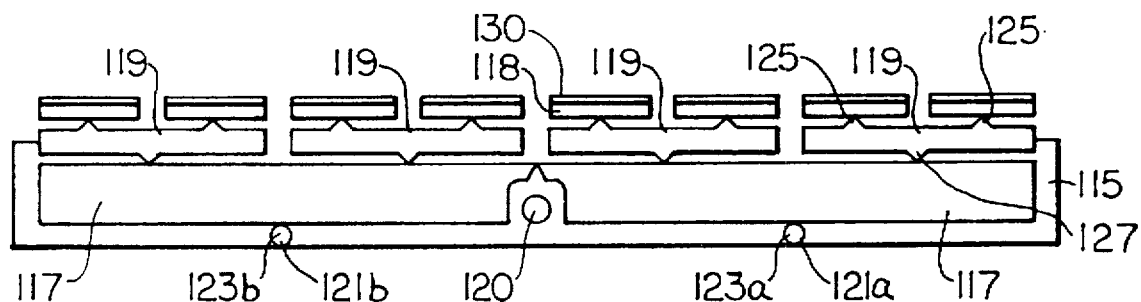
FIG. 6A is a cross sectional view of a support beam forming a portion of the support assembly of FIG. 3.
Figure 6B:
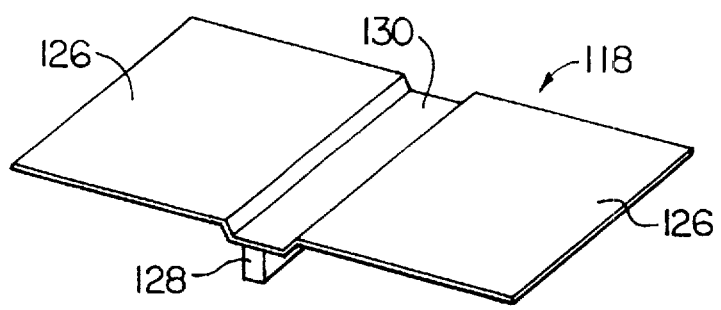
FIG. 6B is a perspective view of a plate forming a portion of the support assembly of FIG. 3.

Referring now to FIGS. 6, 6A, and 6B, each of the plates 118 includes a flat portion 126 and a base portion 128 extending therefrom. In an illustrative embodiment, the plate 118 has a width of about nine inches, wherein each of the plates are spaced about one inch apart. The flat portion 126 of the plate 118 includes a groove portion 130 extending in a direction aligned with a respective support beam 114. The flat portions 126 are flexible in response to a force thereon thus providing compensation for a less than straight support beam or support plate or panel. For example, the flat portions 126 and groove portion 130 form a substantially coplanar surface in response to a sufficient weight placed on a plate 118. It will be appreciated that this plate flexibility compensates for less than perfectly straight support beams 114 yet allows equal weight distribution.

Each of the support beams 114 includes a pair of side portions 115 coupled in opposition, a pair of distribution members 117 and contact members 119 disposed on a respective distribution member. The support beam side portions 115 are coupled by first and second connection posts 121a,121b which rotatably support a respective distribution member 117. The first connection post 121a defines a first post longitudinal axis 123a and the second connection post 121b defines a second post longitudinal axis 123b. A first of the pair of distribution members 117 is rotatable about the first post longitudinal axis 123a and a second of the pair of distribution members 117 is rotatable about a second post longitudinal axis 123b defined by the second connection post 121b. Each of the contact members 119 include plate pivot points 125 for pivotally supporting a respective plate 118 and a contact pivot point 127 adapted for pivotal disposition on a respective distribution member 117.

Figure 7:
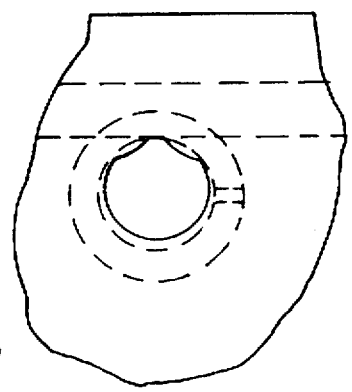
FIG. 7 is a detailed cross sectional view of a support pole of the support assembly of FIG. 4.

Referring now to FIGS. 5–7, the first balance member 120 is centrally positioned on the first support pole 110. The first support pole 110 is substantially annular and includes a contact portion 131 adapted for contact with the first balance member 120. As shown in detail in FIG. 7, the contact portion 130 is formed by beveling portions of the first support pole 110. Since the first support pole 110 does not rotate, the first balance member 120 rocks on the first support pole contact portion with no frictional interference.

In operation, a support plate 103 and panel 101 disposed thereon is symmetrically placed on the support surface for equal weight distribution about the support surface. The support surface operates to distribute the weight of the support plate 103 and panel 101 disposed thereon, about a bottom surface 134 of the support plate. The support surface, defined by the plates 118, rotates about the first longitudinal axis 122 defined by the first support pole 110 and the second longitudinal axis 124 defined by the first balance member 110. The distribution members 117 rotate about the respective first and second connection post longitudinal axes 123a, 123b and the plate 118 rotates about a respective plate pivot point 125. The plate 118 rotates back to front and side to side limited by the support member side portions.

With respect to a displacement of the base assembly 102 with respect to a horizontal plane, the leveling assembly is operative to rotate about the respective axes and pivot points until the leveling assembly 104 support surface formed by the plates 118 is parallel with an average level of the base assembly 102.

Other alternatives and modifications are possible. For example, in other embodiments as shown in FIG. 5A, a panel is placed directly on the support surface. Alternatively, other plate shapes and spacing than those disclosed herein are possible without departing from the scope and spirit of the claims. For example, plates can be circular and disposed among three pairs of support beams. Furthermore, the flat portions of the plates can be pivotable about at least one axis with respect to the base portion of the plates. Still further, the base portions can be pivotable about at least one direction with respect to a respective support beam. Other alternatives, modifications, and omissions are also contemplated. For example, although shown as having two leveling assemblies, other embodiments include only a single assembly. Further, less and more plates and plates having other geometries and pivotable components are within the scope and spirit of the present invention.

An alternative embodiment illustrated of a panel support assembly is illustrated in FIGS. 8–11. The panel support assembly includes a base assembly and leveling assembly adapted for supporting a panel oriented in a vertical position. Placing a panel in a vertical position is particularly useful when compacting a glass in the flat panel display industry. Vertical positioning of panels is well suited for having a plurality of panels in a spaced configuration within a confined area.

Figure 8:
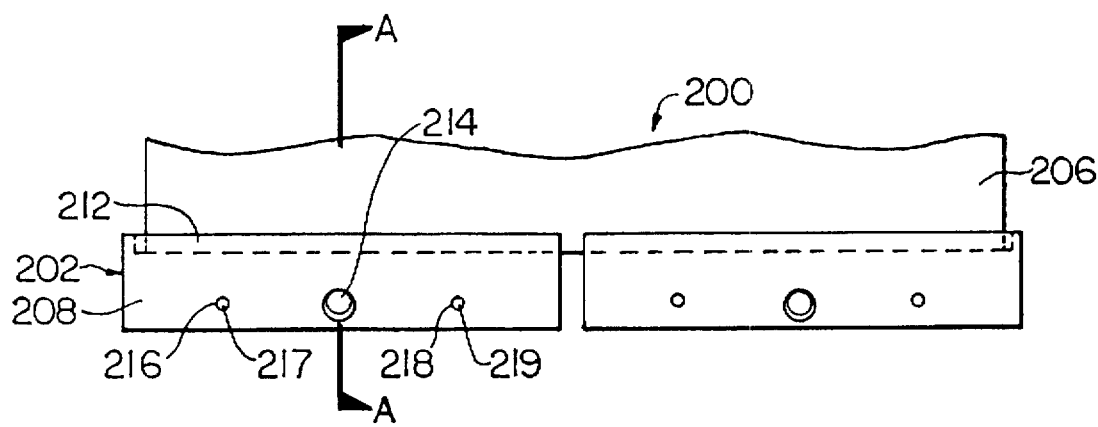
FIG. 8 is a front view of an alternative embodiment of a panel support assembly according to the present invention.
Figure 9:
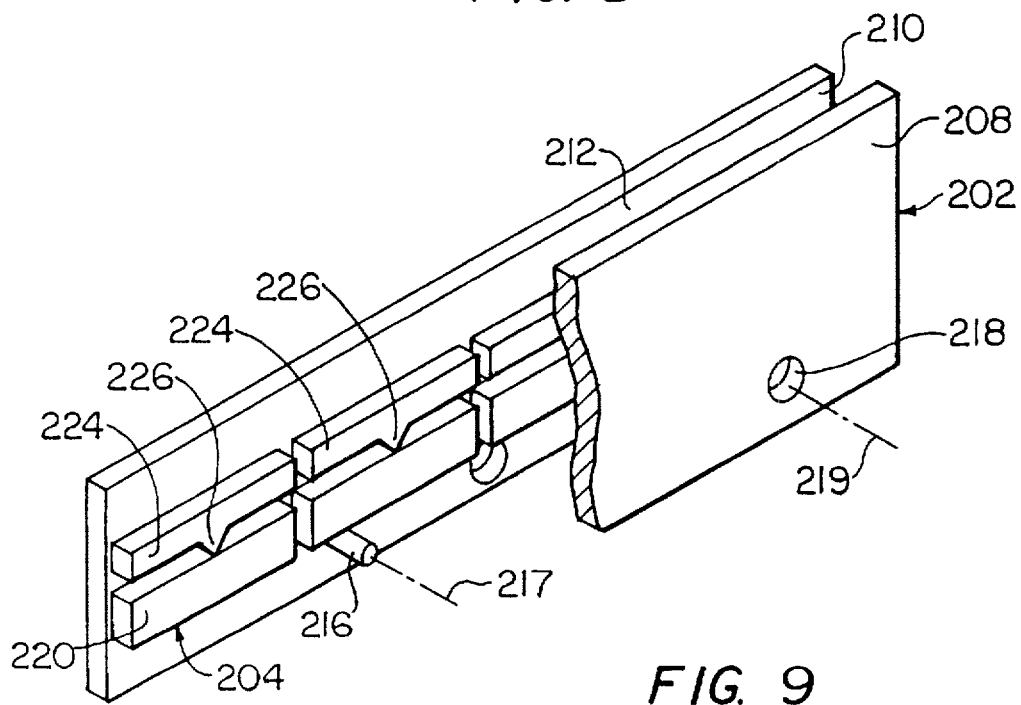
FIG. 9 is a perspective view in partial cross section of the panel support assembly of FIG. 8.
Figure 10:
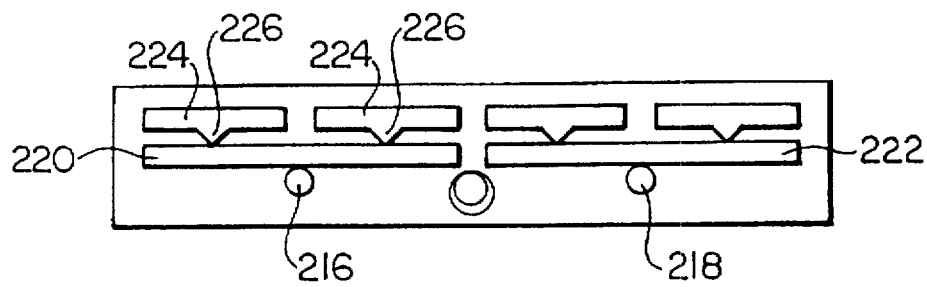
FIG. 10 is a cross sectional view of the panel support assembly of FIG. 8.
Figure 11:
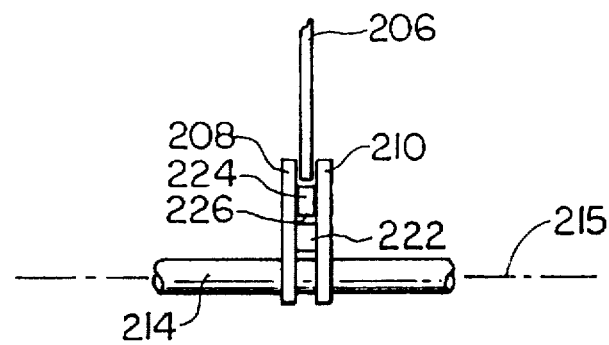
FIG. 11 is a cross sectional side view of the panel support assembly of FIG. 8.

In an illustrative embodiment, a panel support assembly 200 includes a base assembly 202 and a leveling assembly 204 adapted for receiving a vertically disposed panel 206. As shown in FIG. 8, the panel support assembly 200 includes two base assemblies. However, it is understood that one or more than two base assemblies and associated leveling assemblies can be used. It is further understood that a description of one base and leveling assembly also applies to other such assemblies. The base assembly 202 includes a first side portion 208 and a second side portion 210 disposed in opposition and defining a channel 212 adapted for accepting an edge of the panel 206. The base assembly 202 further includes a support rod 214 for supporting the weight of the panel 206 and leveling assembly 204, and first and second connection posts 216,218 for rigidly connecting the first and second side portions 208,210 of the base assembly 202. The support rod 214 is disposed between the first and second connection posts 216,218. The first connection post 216 defines a first longitudinal axis 217 and the second connection post 218 defines a second longitudinal axis 219. The support rod 214 defines a third longitudinal axis 215.

The leveling assembly 204 includes first and second balance members 220,222, each having a pair of panel contact members 224 disposed thereon. The first balance member 220 is rotatably disposed on the first connection post 216 and the second balance member 222 is rotatably disposed on the second connection post 218. Each of the panel contact members 224 includes a pivot member 226 adapted for contact with the respective first and second contact member 224. The panel contact members 224 defines a panel support surface on which a panel edge rests.

In operation, a vertical panel 206 is placed into channel 212 until the panel edge contacts the panel support surface defined by the panel contact members 224 of the leveling assembly 204. The weight of the panel is distributed about the panel edge via the contact members 224. The contact members 224 pivot about the pivot member 226 and the first and second balance members 220,222 rotate about the respective first and second longitudinal axes 217,219 defined by the respective first and second connection posts 216, 218. The panel weight is equally distributed between the first and second connection posts 216,218. The base assembly 202 rotates about the third longitudinal axis 215 defined by the support rod 214. Thus, the weight of the panel 206 is distributed about the panel edge.

Other embodiments are possible within the scope of the invention. For example, less and more axes of rotation for weight distribution and levelling are contemplated. An alternative embodiment includes a series of coplanar support surfaces for supporting a plurality of support plates and panels. In a further embodiment, support beams include additional members capable of rotation about respective additional axes for equal weight distribution.

Figure 12:
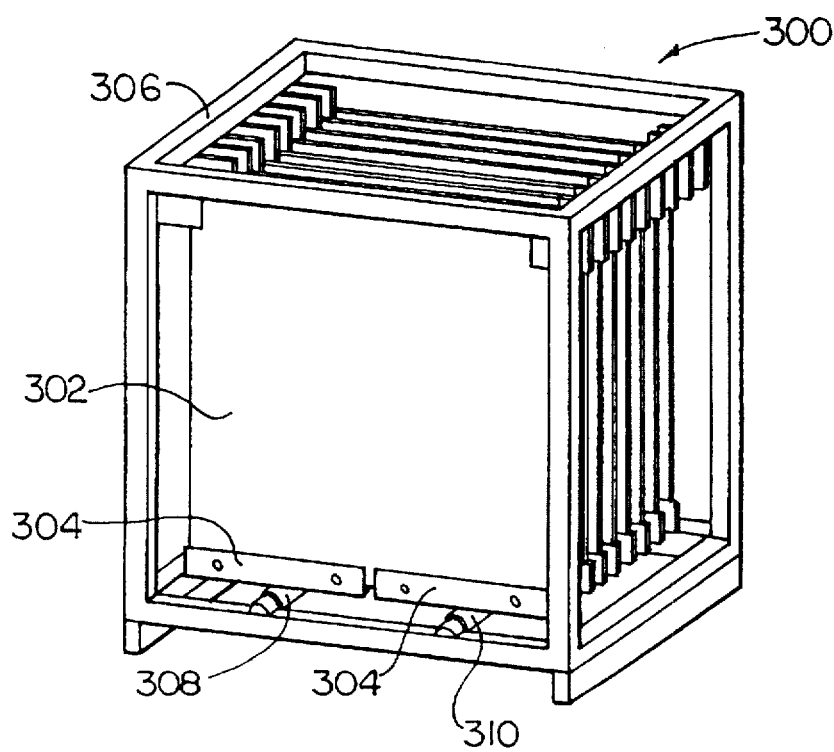
FIG. 12 is a perspective view of a further embodiment of a panel support assembly for supporting a plurality of panels according to the present invention.

FIG. 12 illustrates a further embodiment of a panel support assembly 300 similar in structure and operation to the panel support assembly of FIGS. 8–11, but adapted for supporting a plurality of vertically spaced panels 302. The panel assembly 300 includes first and second base assemblies 304 and corresponding leveling assemblies housed therein held in a frame structure 306.

In operation, support rods 308,310 support the weight of the panels 302 and the base and leveling assemblies 304. Each of the first and second base assemblies 304 is independently rotatable about a respective support rod 308,310. Each of the leveling assemblies corresponding to the respective base assembly 304 is operative to distribute the weight of the respective panel on an edge of the panel 302 supported thereby. The weight of the panels 302 is thus distributed about bottom edges of the panels.

Although the invention has been shown and described with respect to exemplary embodiments thereof, various other changes, omissions, and additions in form and detail thereof may be made therein without departing from the spirit and scope of the invention.

What is claimed is:

1. A support assembly for supporting a support plate having a generally flat bottom surface wherein said support plate is adapted for having a panel placed thereon, said support assembly comprising:

a base member; and a mechanism secured to said base member, said mechanism including:

a cross member having a first portion defining a first longitudinal axis and a second portion defining a second longitudinal axis, said first portion coupled to said base member and adapted for supporting said mechanism above said base member, said cross member rotatable about said first longitudinal axis;

a first support member coupled to said cross member second portion; and a second support member coupled to said cross member second portion, wherein said first longitudinal axis is disposed between said first and second support members;

said first and second support members being operative upon rotation of said cross member about said first longitudinal axis to remain in engagement with said bottom surface of said support plate thereby automatically distributing the weight of said support plate and any panel disposed thereon about said bottom surface of said support plate.

2. The support assembly according to claim 1, wherein said first and second support members are rotatable about said second longitudinal axis.

3. The support assembly according to claim 1, wherein said base member further includes a bottom portion and at least a pair of opposing side portions extending perpendicularly from said bottom portion.

4. The support assembly according to claim 1, wherein said first portion of said cross member is secured between a first of said at least a pair of opposing side portions of said base member.

5. The support assembly according to claim 1, wherein said second portion of said cross member includes a first end coupled to a central portion of said first support member, and a second end coupled to a central portion of said second support member.

6. The support assembly according to claim 1, further including a further mechanism secured to said base member.

7. The support assembly according to claim 1, wherein said support assembly is adapted for attachment to a conveyor belt.

8. A support assembly for supporting a glass panel bearing support plate, comprising:
   a base member having a bottom portion and opposing side portions extending from said bottom portion;
   a cross member including a first portion defining a first longitudinal axis, said first portion extending between said opposing side portions of said base member and a second portion defining a second longitudinal axis, said cross member rotatable about said first longitudinal axis;
   a first support plate support member coupled to said second member of said cross member; and
   a second support plate support member coupled to said second member of said cross member, wherein said first longitudinal axis is disposed between said first and second support members, and said first and second support plate members are rotatable about said second longitudinal axis,
   wherein said first and second support plate support members define a support plate support plane for retaining engagement of a bottom surface of said support plate with said first and second support plate support members.

9. A support assembly adapted for preserving the flatness of a support plate in a high temperature environment, said support assembly comprising:
   a base assembly including:
      a first portion and a second portion; and
      a first support pole defining a first longitudinal axis, said first support pole extending from said first portion to said second portion of said base assembly; and
   a leveling assembly adapted for placement on said base assembly, said leveling assembly including:
      first and second support beams extending from a point proximate said first portion to a point proximate said second portion of said base assembly;
      a plurality of plates defining a support surface adapted for engagement with a bottom surface of said support plate, each of said plurality of plates disposed on one of said first and second support beams;
      a first balance member defining a second longitudinal axis, said first balance member extending from said first support beam to said second support beam, and adapted for supporting said leveling assembly,
   wherein said support surface is operative to automatically distribute the weight of said support plate and any panel disposed thereon about said bottom surface of said support plate.

10. The support assembly according to claim 9, wherein said support surface is rotatable about said first longitudinal axis.

11. The support assembly according to claim 9, wherein said support surface is rotatable about said second longitudinal axis.

12. The support assembly according to claim 9, wherein at least a first of said first and second beams includes a stop portion for limiting rotational movement of said first and second support beams about said second longitudinal axis.

13. The support assembly according to claim 9, wherein each of said support beams includes a pair of side portions coupled by at least one connection post.

14. The support assembly according to claim 9, wherein each of said support beams includes at least one contact member disposed between said side portions of said support member, said at least one contact member adapted for supporting one of said plates.

15. The support assembly according to claim 14, wherein each of said support beams further includes a distribution member rotatably supported on said at least one connection post, wherein said at least one contact member is pivotally disposed on said distribution member.

16. The support assembly according to claim 15, wherein said at least one contact member includes a pair of plate pivot points each adapted for pivotally supporting one of said plates.

17. The support assembly according to claim 15, wherein said at least one contact member includes a pivot point for pivotally supporting said at least one contact member on said distribution member.

18. The support assembly according to claim 9, wherein said support pole includes a contact portion adapted for contact with said balance member, said contact portion defined by a beveled portion of said support pole.

19. A support assembly for supporting a support plate in during thermal processing, comprising:
   a base assembly including:
      a first portion;
      a second portion disposed in opposition with said first portion; and
      a first support pole extending between said first and second portions of said base assembly; and
   a leveling assembly adapted for rotatable placement on said base assembly, said leveling assembly including:
      a first support beam extending approximately from said first portion to said second portion of said base assembly;
      a second support beam extending approximately from said first portion to said second portion of said base assembly, said first and second support beams disposed in opposition;
      a balance member coupled between said first and second support beams, said balance member adapted for supporting said leveling assembly on said base assembly; and
      a plurality of plates forming a support surface adapted for distributing the weight of said support plate and any panel disposed thereon about a bottom surface of said support plate.

20. A panel support mechanism for supporting a vertically positioned panel, comprising:
   a base assembly including
      a first side member;
      a second side member spaced apart from said first side member; and
      a support rod for supporting said panel, said support rod extending from said first side member to said second side member of said base assembly, wherein said base assembly is rotatable about a longitudinal axis defined by said support rod; and
   a leveling assembly including
      a first balance member supported by said base assembly;
      a second balance member supported by said base assembly and disposed on an opposite side of said support rod with respect to said first balance member;

a first contact member rotatably disposed on said first balance member; and a second contact member rotatably disposed on said second balance member, wherein said first and second contact members define a panel support surface.

21. The panel support assembly according to claim 20, wherein said base assembly further includes a first connection post extending from said first side member to said second side member of said base assembly, said first connection post supporting said first balance member.

22. The panel support assembly according to claim 20, wherein said first contact member includes a pivot member allowing said first contact member to pivot on said first balance member.

23. The panel support assembly according to claim 20, further including a plurality of base assemblies and leveling assemblies for supporting a plurality of vertical spaced apart panels.

24. A support assembly for supporting a panel having a generally flat bottom surface, said support assembly comprising:

a base member; and a mechanism secured to said base member, said mechanism including:

a cross member having a first portion defining a first longitudinal axis and a second portion defining a second longitudinal axis, said first portion coupled to said base member and adapted for supporting said mechanism above said base member, said cross member rotatable about said first longitudinal axis;

a first support member coupled to said cross member second portion; and a second support member coupled to said cross member second portion, wherein said first longitudinal axis is disposed between said first and second support members;

said first and second support members being operative upon rotation of said cross member about said first longitudinal axis to remain in engagement with said bottom surface of said panel thereby automatically distributing the weight of said panel about said bottom surface.

25. A support assembly adapted for preserving the flatness of a panel in a high temperature environment, said support assembly comprising:

a base assembly including:

a first portion and a second portion; and a first support pole defining a first longitudinal axis, said first support pole extending from said first portion to said second portion of said base assembly; and a leveling assembly adapted for placement on said base assembly, said leveling assembly including:

first and second support beams extending from a point proximate said first portion to a point proximate said second portion of said base assembly;

a plurality of plates defining a support surface adapted for engagement with a bottom surface of said panel, each of said plurality of plates disposed on one of said first and second support beams;

a first balance member defining a second longitudinal axis, said first balance member extending from said first support beam to said second support beam, and adapted for supporting said leveling assembly, wherein said leveling assembly is operative to automatically distribute the weight of said panel about said bottom surface of said panel.

* * * * *